(12) United States Patent
Howard et al.

(10) Patent No.: US 12,099,595 B2
(45) Date of Patent: Sep. 24, 2024

(54) TECHNOLOGY FOR PROVIDING PASSWORD SECURITY

(71) Applicant: INTERNATIONAL BUSINESS MACHINES CORPORATION, Armonk, NY (US)

(72) Inventors: Sally L Howard, Eastleigh (GB); Timothy Andrew Moran, Hampshire (GB); Emma Jane Dawson, Eastleigh (GB); Katherine Rose Farmer, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 305 days.

(21) Appl. No.: 17/656,551

(22) Filed: Mar. 25, 2022

(65) Prior Publication Data

US 2023/0306104 A1    Sep. 28, 2023

(51) Int. Cl.
*G06F 21/45*      (2013.01)
*G06F 3/0482*     (2013.01)

(52) U.S. Cl.
CPC ............ *G06F 21/45* (2013.01); *G06F 3/0482* (2013.01); *G06F 2221/2125* (2013.01)

(58) Field of Classification Search
None
See application file for complete search history.

(56) References Cited

U.S. PATENT DOCUMENTS

| 8,423,899 | B1 | 4/2013 | Crane |
| 9,396,322 | B2 | 7/2016 | Chougle |
| 9,590,808 | B2 | 3/2017 | Jiang |
| 10,440,007 | B1* | 10/2019 | Ramalingam ........... G06F 21/84 |
| 2015/0254452 | A1 | 9/2015 | Kohlenberg |
| 2021/0092155 | A1* | 3/2021 | Wang .................... H04L 63/083 |
| 2021/0224471 | A1 | 7/2021 | Menichetti |
| 2022/0019653 | A1* | 1/2022 | Singla ..................... G06F 21/46 |
| 2022/0417238 | A1* | 12/2022 | Maiman ................ H04L 63/102 |

FOREIGN PATENT DOCUMENTS

| EP | 2921983 B1 | 8/2018 |
| EP | 3367278 B1 | 11/2020 |

OTHER PUBLICATIONS

Disclosed Anonymously, "Method of Protection from Password Disclosure during Interrupted/ Mistaken Authentication Operation (i.e. by pop up window)", An IP.com Prior Art Database Technical Disclosure, IP.com No. IPCOM000240725D, Feb. 23, 2015, 5 pgs.

* cited by examiner

*Primary Examiner* — Jeffrey R Swearingen (74) *Attorney, Agent, or Firm* — James L. Olsen (57) ABSTRACT

Technology for password entry security that monitors a text entry field that is not an appropriate text entry field for password entry, and, on condition that a user enters a first portion of a designated user password into the text entry field, then machine logic deletes and/or obscures at least the first portion of the password from the text entry field so that it cannot be espied or intercepted by unauthorized parties. IN some embodiments, an integer number N is designated to determine how many characters must be in the first portion entered by the user before the password text is deleted or obscured.

3 Claims, 6 Drawing Sheets

FIG. 7

TECHNOLOGY FOR PROVIDING PASSWORD SECURITY

BACKGROUND

The present invention relates generally to the field of password security and specifically to the entry of secret passwords, for example alphanumeric passwords, by a human.

The Wikipedia entry for "Shoulder surfing (computer security)" (as of Mar. 1, 2022) states, in part, as follows: "In computer security, shoulder surfing is a type of social engineering technique used to obtain information such as personal identification numbers (PINs), passwords and other confidential data by looking over the victim's shoulder. Unauthorized users watch the keystrokes inputted on a device or listen to sensitive information being spoken, which is also known as eavesdropping. Methods and history[.] This attack can be performed either at close range (by directly looking over the victim's shoulder) or from a longer range with, for example a pair of binoculars or similar hardware. Attackers do not need any technical skills in order to perform this method, and keen observation of victims' surroundings and the typing pattern is sufficient. In the early 1980s, shoulder surfing was practiced near public pay phones to steal calling card digits and make long-distance calls or sell them in the market for cheaper prices than the original purchaser paid. However, the advent of modern-day technologies like hidden cameras and secret microphones makes shoulder surfing easier and gives the attacker more scope to perform long range shoulder surfing. A hidden camera allows the attacker to capture whole login process and other confidential data of the victim, which ultimately could lead to financial loss or identity theft. Shoulder surfing is more likely to occur in crowded places because it is easier to observe the information without getting the victim's attention. There are two types of shoulder-surfing attack: direct observation attacks, in which authentication information is obtained by a person who is directly monitoring the authentication sequence, and recording attacks, in which the authentication information is obtained by recording the authentication sequence for later analysis to open the device. Apart from threats to password or PIN entry, shoulder surfing also occurs in daily situations to uncover private content on handheld mobile devices; shoulder surfing visual content was found to leak sensitive information of the user and even private information about third-parties." (footnote(s) omitted)

SUMMARY

According to an aspect of the present invention, there is a method, computer program product and/or system that performs the following operations (not necessarily in the following order): (i) receiving an alphanumeric user password text string; (ii) monitoring a text entry field to determine that the user has entered a first portion of a predetermined size of the password text string into the text entry field; and (iii) responsive to the determination that the user has entered a first portion, changing a display of the text entry field so that the entered first portion of the password text string is not visible in the display of the text entry field.

DETAILED DESCRIPTION

This Detailed Description section is divided into the following subsections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product at any possible technical detail level of integration. The computer program product may include a computer readable storage medium (or media) having computer readable program instructions thereon for causing a processor to carry out aspects of the present invention. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

A "storage device" is hereby defined to be anything made or adapted to store computer code in a manner so that the computer code can be accessed by a computer processor. A storage device typically includes a storage medium, which is the material in, or on, which the data of the computer code is stored. A single "storage device" may have: (i) multiple discrete portions that are spaced apart, or distributed (for example, a set of six solid state storage devices respectively located in six laptop computers that collectively store a single computer program); and/or (ii) may use multiple storage media (for example, a set of computer code that is partially stored in as magnetic domains in a computer's non-volatile storage and partially stored in a set of semiconductor switches in the computer's volatile memory). The term "storage medium" should be construed to cover situations where multiple different types of storage media are used.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
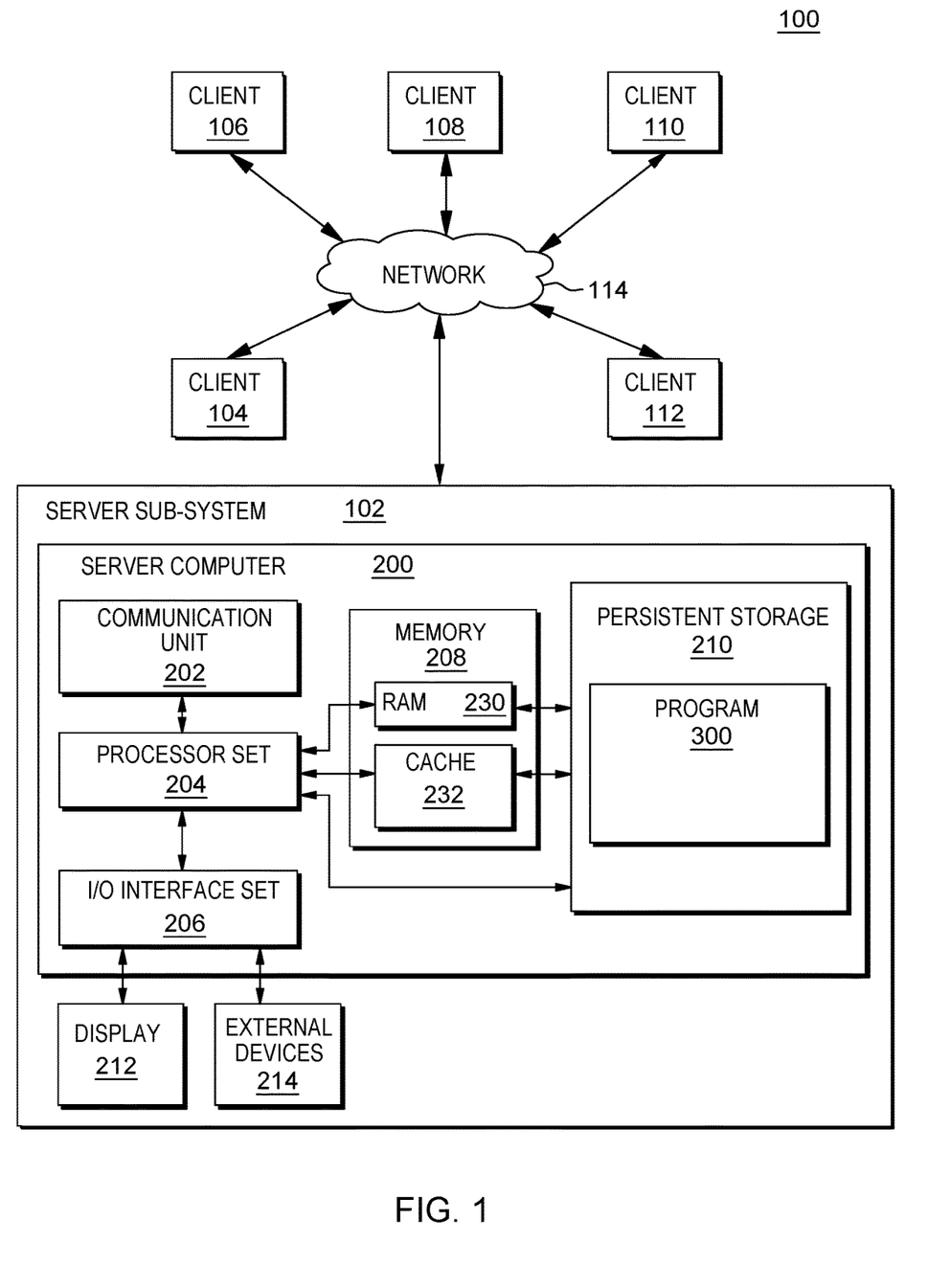
FIG. 1 is a block diagram view of a first embodiment of a system according to the present invention.

As shown in FIG. 1, networked computers system 100 is an embodiment of a hardware and software environment for use with various embodiments of the present invention. Networked computers system 100 includes: server subsystem 102 (sometimes herein referred to, more simply, as subsystem 102); client subsystems 104, 106, 108, 110, 112; and communication network 114. Server subsystem 102 includes: server computer 200; communication unit 202; processor set 204; input/output (I/O) interface set 206; memory 208; persistent storage 210; display 212; external device(s) 214; random access memory (RAM) 230; cache 232; and program 300.

Subsystem 102 may be a laptop computer, tablet computer, netbook computer, personal computer (PC), a desktop computer, a personal digital assistant (PDA), a smart phone, or any other type of computer (see definition of "computer" in Definitions section, below). Program 300 is a collection of machine readable instructions and/or data that is used to create, manage and control certain software functions that will be discussed in detail, below, in the Example Embodiment subsection of this Detailed Description section.

Subsystem 102 is capable of communicating with other computer subsystems via communication network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client subsystems.

Subsystem 102 is shown as a block diagram with many double arrows. These double arrows (no separate reference numerals) represent a communications fabric, which provides communications between various components of subsystem 102. This communications fabric can be implemented with any architecture designed for passing data and/or control information between processors (such as microprocessors, communications and network processors, etc.), system memory, peripheral devices, and any other hardware components within a computer system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for subsystem 102; and/or (ii) devices external to subsystem 102 may be able to provide memory for subsystem 102. Both memory 208 and persistent storage 210: (i) store data in a manner that is less transient than a signal in transit; and (ii) store data on a tangible medium (such as magnetic or optical domains). In this embodiment, memory 208 is volatile storage, while persistent storage 210 provides nonvolatile storage. The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202 provides for communications with other data processing systems or devices external to subsystem 102. In these examples, communications unit 202 includes one or more network interface cards. Communications unit 202 may provide communications through the use of either or both physical and wireless communications links. Any software modules discussed herein may be downloaded to a persistent storage device (such as persistent storage 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. I/O interface set 206 also connects in data communication with display 212. Display 212 is a display device that provides a mechanism to display data to a user and may be, for example, a computer monitor or a smart phone display screen.

In this embodiment, program 300 is stored in persistent storage 210 for access and/or execution by one or more computer processors of processor set 204, usually through one or more memories of memory 208. It will be understood by those of skill in the art that program 300 may be stored in a more highly distributed manner during its run time and/or when it is not running. Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
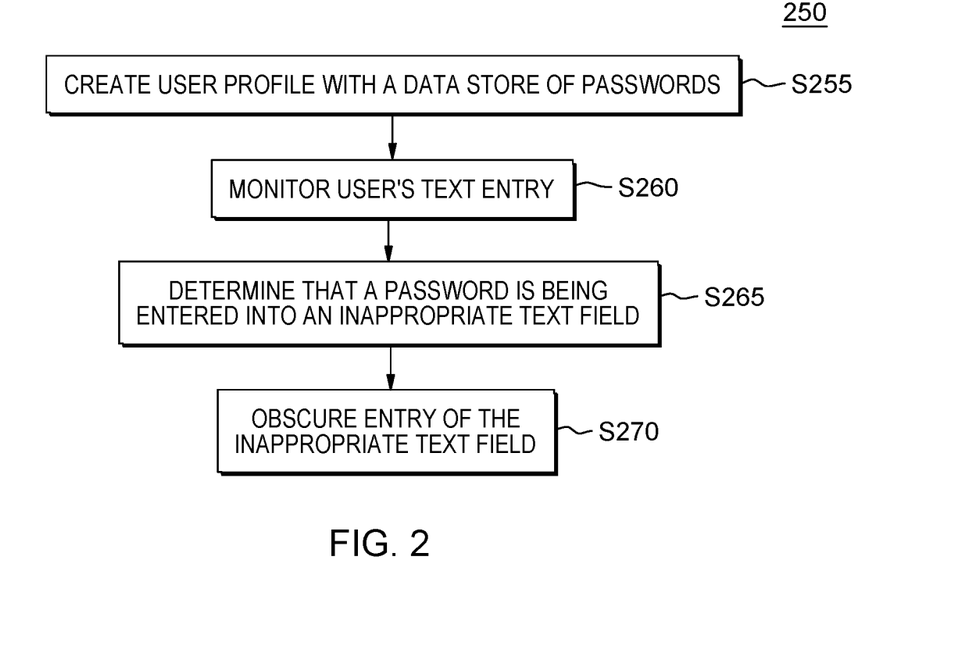
FIG. 2 is a flowchart showing a first embodiment method performed, at least in part, by the first embodiment system.
Figure 3:
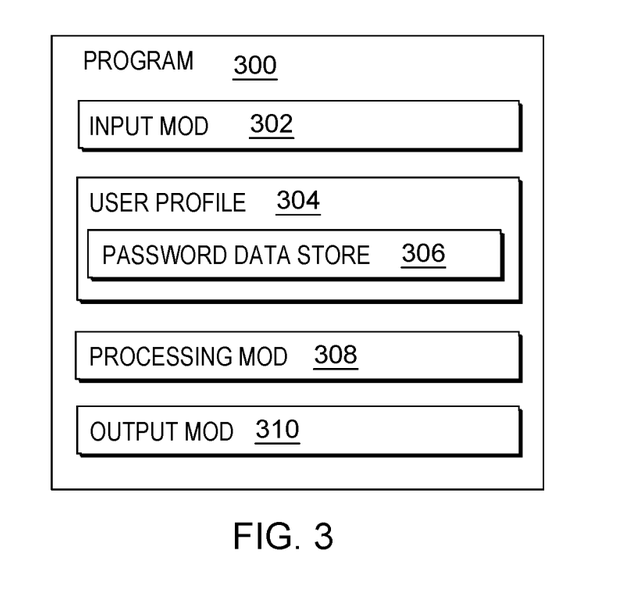
FIG. 3 is a block diagram showing a machine logic (for example, software) portion of the first embodiment system.

As shown in FIG. 1, networked computers system 100 is an environment in which an example method according to the present invention can be performed. As shown in FIG. 2, flowchart 250 shows an example method according to the present invention. As shown in FIG. 3, program 300 performs or controls performance of at least some of the method operations of flowchart 250. This method and associated software will now be discussed, over the course of the following paragraphs, with extensive reference to the blocks of FIGS. 1, 2 and 3.

Processing begins at operation S255, where input mod 302 receives input data to create user profile 304, including password data store 306. In this example, the user profile corresponds to the user of client subsystem 104 (which, in this example is the user's smart phone). The password data store includes a set of alphanumeric strings that correspond to all of the user's passwords. Some of these passwords are traditional passwords, like the type of passwords that one might have to get into an email account or an online bank account. Other "passwords" may correspond to alphanumeric strings that are secret and confidential, such as the user's social security number or the card verification value. Another possible example might be an alphanumeric code relating to the individual's specific genetics. While these examples might not be considered as passwords in common parlance, for purposes of this document, the term "password" should be construed broadly enough to cover these sorts of secret alphanumeric codes regardless of whether they are used in the manner of more traditional sorts of passwords. It is also, noted that a single "password" may result in multiple entries in data store 304. For example, in this example, the user's social security number is recorded in two versions—one with dashes inserted at the standard intervals and one version without dashes. In this example, the entire passwords are stored because server subsystem 102 is controlled and maintained by a highly trusted party. Alternatively, in some embodiments, only the initial portion (for example, initial N characters) of each password is stored, which can potentially provide better password security by minimizing distribution and exposure of full passwords. The stored password portions do need to provide enough characters to match the portion under the threshold set in a given application in order to determine a partial password match (as will be discussed in more detail below).

Processing proceeds to operation S260, where processing mod 308 monitors the user's entry of text located in various text fields in various web pages that the user visits when the user communicates online. An example of this is shown in screenshot 400a of FIG. 4A, where the visible text fields are "address line 1," "address line 2," and "social security number." As will be understood by those of skill in the art, the last field is a text field that is appropriate for password entry and the other two fields are examples of text fields where password entry would not be appropriate. In this example, processing mod 308 is programmed to recognize the text field descriptor "social security number," or "SSN" as being indicative of a password appropriate text field.

Figure 4A:
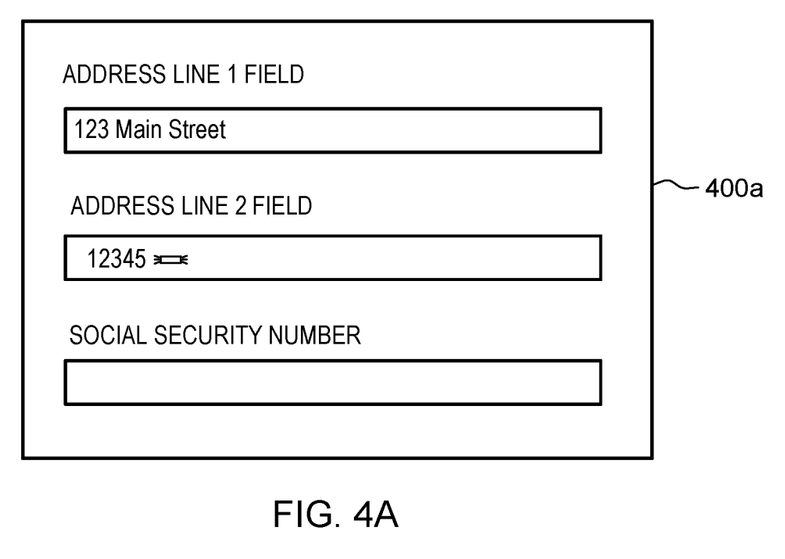
FIG. 4A is a screenshot view generated by the first embodiment system.

Processing proceeds to operation S265, where processing mod 308 determines that the user has entered a first portion of a predetermined size of a password text string into a text entry field that is not appropriate for password entry. More specifically, and as shown in FIG. 4A, the user has just entered five keystrokes that correspond to the first five (5) digits of their nine (9) digit SSN. This is the first portion of a password in password data store 304 that triggers detection of a first portion of a password into an inappropriate text entry field.

In this example, processing mod 308 is programmed to detect that a "first portion" has been entered when the number of keystrokes is greater than 50% of the total password length. Alternative, the threshold for a match may be set at a different value than 50% (for example, five matching characters in a row at the beginning, or 75% of the number of total password characters). As shown in FIG. 4A, when the user entered "123 Main Street," only 33% of the user's SSN was entered, meaning that the text entry in this field did not detect a match to a password—the matching keystrokes was not large enough to be considered as a "first portion" of a password. As discussed in the next section of this Detailed Description, in some embodiments, there is a predetermined integer N, and a match is determined when the first N characters of one of the user's passwords. In this example, the "first portion" as shown in FIG. 4A are the first five characters entered into the non-password text entry field. As discussed in the next sub-section of this Detailed Description section, in some embodiments, a "first portion" may be detected even when there have been keystrokes in the non-password text entry field prior to the start of the "first portion."

Figure 4B:
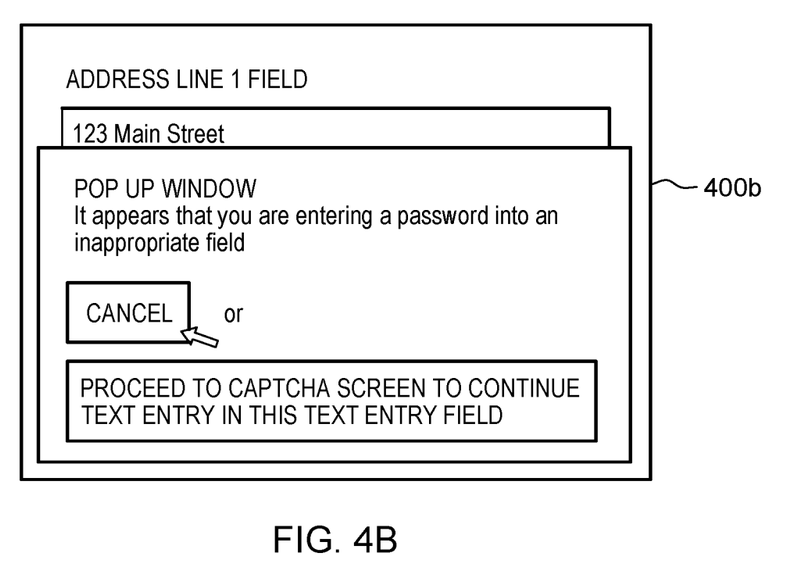
FIG. 4B is a screenshot view generated by the second embodiment system.

Processing proceeds to operation S270, using output mod 310, where the keystrokes in the non-password text entry field (that is, the address line 2 text entry field) are hidden by a popup window. This is shown in screenshot 400b of FIG. 4B. As discussed in the next sub-section of this Detailed Description section, there are other ways of obscuring the "first portion." One way of rendering the "first portion" as not visible is to delete the entered first portion of the password text string so that no keystrokes are entered into the text entry field.

III. Further Comments and/or Embodiments

Some embodiments of the present invention recognize the following facts, potential problems and/or potential areas for improvement with respect to the current state of the art: (i) when authenticating with a service, a user is usually required to authenticate credentials such as a username and password; (ii) there is nothing to prevent the user from typing in the user's password in the wrong field (such as the username field); (iii) when the operations mentioned in the previous item happen, the password is at risk of being exposed and the user's account compromised in multiple ways including: (a) anyone in the vicinity of the screen can read the password, and (b) if the user presses enter, then the password is sent to the remote system in a field that may not be protected at the remote system, or in transit; and/or (iv) the above operations are more likely to happen for inexperienced users such as elderly people, but even experienced users.

Figure 5A:
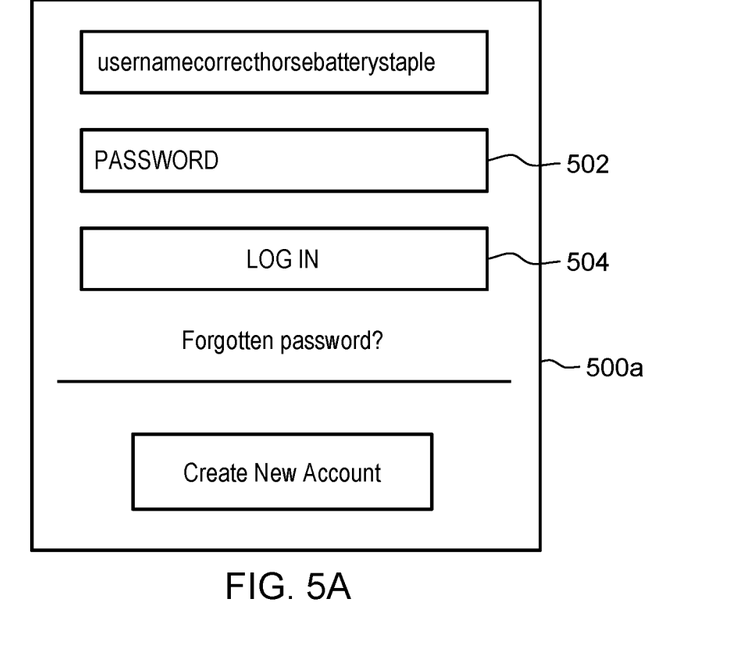
FIG. 5A is another screenshot view generated by the second embodiment system.
Figure 5B:
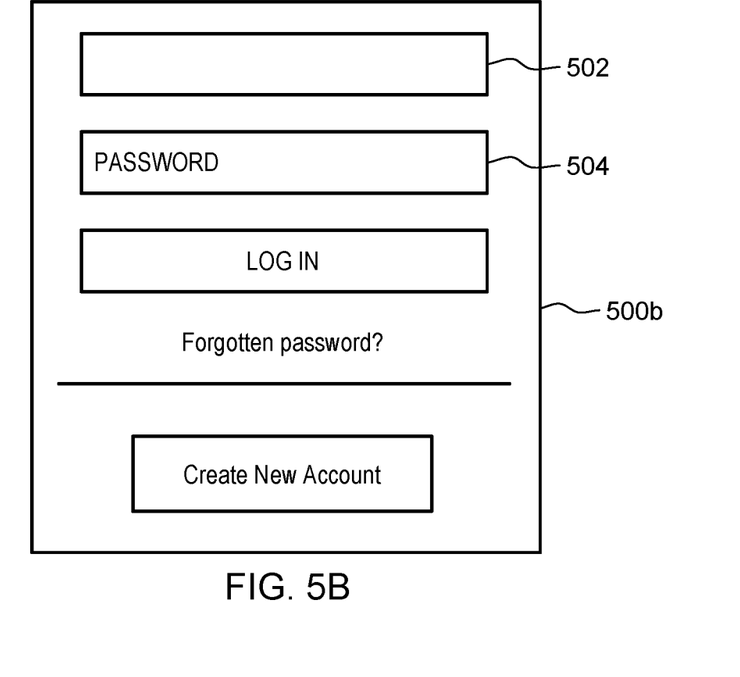
FIG. 5B is another screenshot view generated by the second embodiment system.

As shown in screenshots 500a and 500b (of FIGS. 5A and 5B), in some embodiments the present invention detects that a sub-string at the beginning of the user's password is being typed into the incorrect field and responds by obscuring the typed portion of the password. More specifically, as shown in FIG. 5A, the user has neglected to hit the TAB key after entering their username (in this example, "username") in username entry field 502, and has proceeded to enter the beginning of their password (full password is correcthorsebatterystaple*555!) in field 502 instead of password entry field 504. One consequence of this mistake is that the present invention scrubs all typed keystrokes from field 502, as shown in screenshot 500b of FIG. 5B.

Figure 6A:
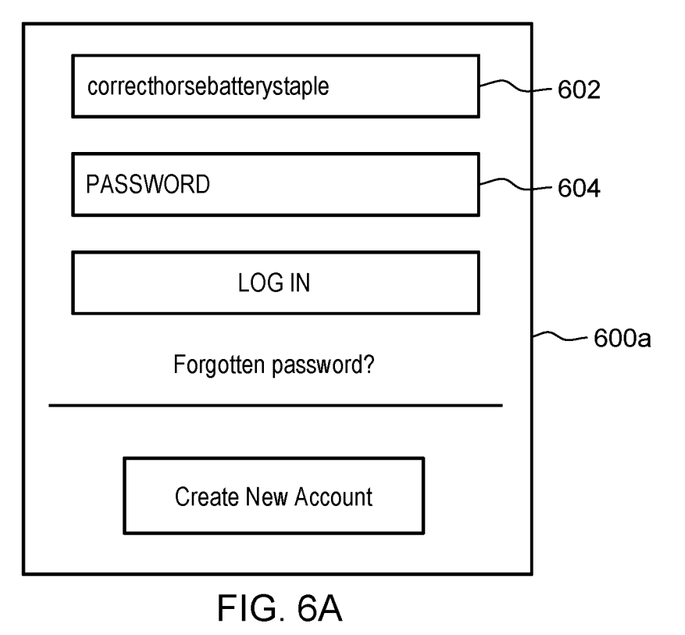
FIG. 6A is another screenshot view generated by the second embodiment system.
Figure 6B:
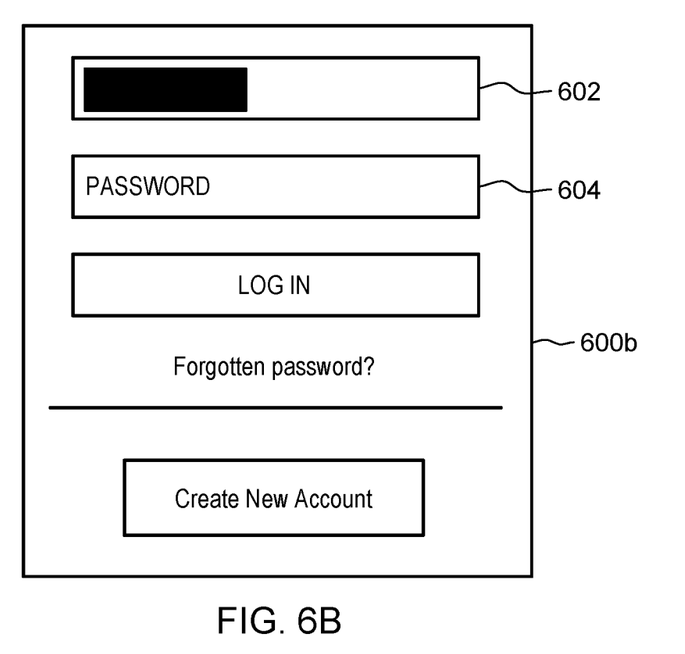
FIG. 6B is another screenshot view generated by the second embodiment system.

As shown in screenshots 600a and 600b (of FIGS. 6A and 6B), in another embodiment, machine logic according to the present invention detects that the beginning portion of the password is being entered in username entry field 602 instead of password entry field 604 and responds by obscuring the typed keystrokes without actually deleting or scrubbing them (see screenshot 600b).

Figure 7:
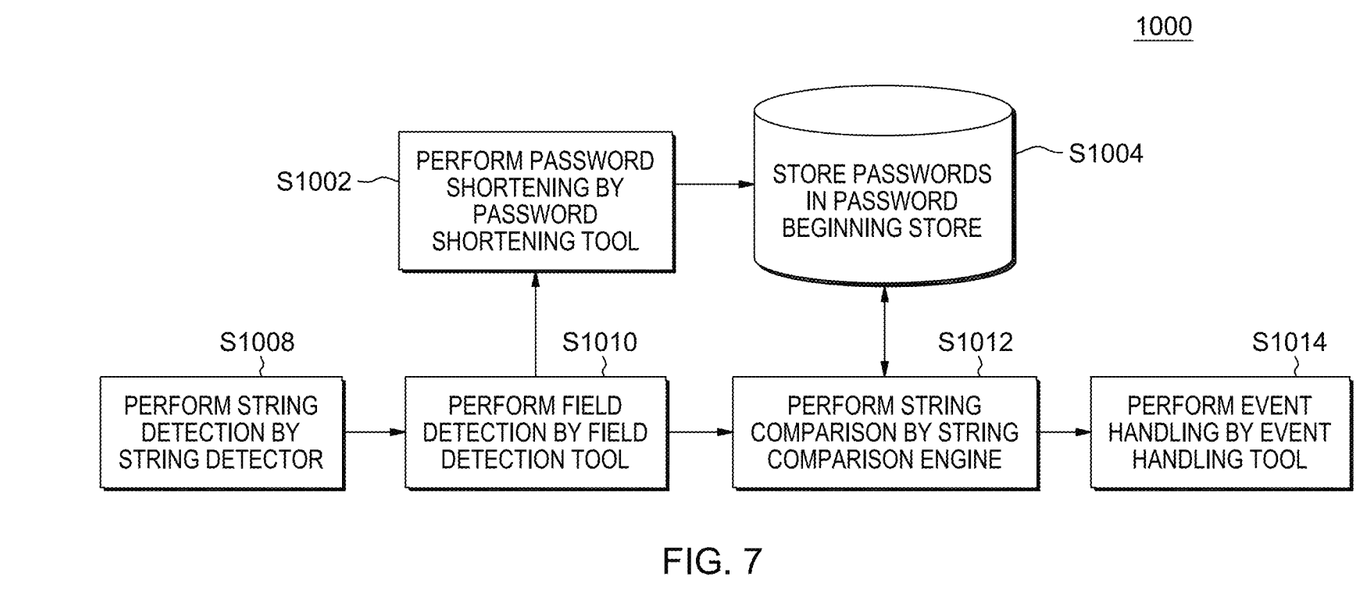
FIG. 7 is a flowchart showing a second embodiment of a method.

As shown in FIG. 7, flowchart 1000 represents a method according to the present invention. At operation S1004, password-beginnings are stored in a data store (for example, a database stored in a storage device). When setting up a new account, or accessing an existing account from this system for the first time, operations S1008 and S1010 determine that a string is a password, by detecting that it has been typed into the password field (and, in some embodiments, further by verifying that the string has been re-entered into the confirm password field). At operations S1002 and S1004, the first N characters of this password are stored as a password-beginning in a store of password-beginnings for the user. The choice of N is implementation specific, but is generally preferable to choose N so that the user's entire password is not stored for security reasons. On the other hand, if N is too small, then that increases the likelihood of a "false positive," which is to say that the system will determine that a user is typing in a password when that is not what is actually happening. At operation S1012, it is detected whether a password is being typed into a non-password field. More specifically, the user starts typing a string which triggers the system, and then the system checks whether the string is being entered into a password field (for example, input type="password"). If it is not a password field, then the string being typed by the user is checked against the stored password-beginnings list. Each time a character is added to the string, the previous N characters are matched against all password-beginnings of that length stored in the password store. This allows a password-beginning to be detected even if it is not delimited by a new field or a space bar before the password. If the string being typed matches a known password-beginning, then processing proceeds to operation S1014, where: (i) the user is prevented from entering the rest of the string unless they actively confirm that they wish to do so (to prevent the secure part of the password from being revealed); and (ii) optionally, the password-beginning that has already been entered in that field is hidden or deleted (to minimize the time that the typed-in portion of the password is exposed to view).

A method according to an embodiment of the present invention includes the following operations (not necessarily in the following order): (i) monitors an input that is manually typed into an input field; (ii) detects that a password is being typed into a non-password field by cross-referencing the input to a known database of the user's passwords; and/or (iii) once the input has been determined as a password, prevents the rest of the password from being visible or typed.

Some embodiments of the present invention may include one, or more, of the following operations, features, characteristics and/or advantages: (i) allows both the first and second part of the password to contain any characters (that is, the allowed and the restricted sections of the string contain the same character set); (ii) does not allow the user to enter any further characters into the field if the first part of the string contains the password-beginning that triggers the protection; (iii) includes switching the user input modes (that is, switch from a mode in which the user input is displayed to a different mode that prevents the user typing the rest of the password); (iv) the switch described in item (iii) above is driven by detecting a password-beginning; (v) includes a form of protection that would store 'password1' as the password-beginning (as the shortest string that doesn't appear in a common dictionary search); and/or (vi) includes only revealing 'password1' in a non-password field, and then restrict the user from entering the rest of the password in that field.

Some embodiments of the present invention may include one, or more, of the following operations, features, characteristics and/or advantages: (i) includes an 'auto-incomplete' process meaning that when the user begins typing sensitive information in the wrong field, the system automatically suppresses the user from completing the population of that field; (ii) item (i) above can be implemented: (a) when the user has set up passwords in the past, sub-strings representing the beginning of those passwords have been collected; and/or (b) if any of those sub-strings are entered in any field other than a password field, the application restricts further user input until the problem is resolved including: (1) prompting (visually, or alert sign) that the user has made a mistake, (2) requiring the user to take an action to correct their mistake (for example, deleting the sub-string), and/or (3) automatically correcting the problem (for example, the system could remove the sub-string itself, but would still require the user to acknowledge this, otherwise the user might unwittingly continue to type the rest of the password); and/or (iii) in an operating system, monitor any text that the user is inputting, or any text that is openly displayed on a screen, and prevent the user from completing a string if the sensitive sub-string is detected.

Some embodiments of the present invention may include one, or more, of the following operations, features, characteristics and/or advantages: (i) compares an entered string to a stored partial password-beginning, thus knowing with certainty that the rest of the string will be a password, and preventing further entry; (ii) can monitor entry into any field (not just a user name field), and prevents further character entry only if the typed string is on a 'denied list' of password-beginnings, which is more generally useful; (iii) is applicable to any text entry (not just username fields); (iv) works by preventing any further entry of characters that follow an entered character string that is in a known 'blocked list' (of password beginnings); (v) does not require usernames and complete passwords to be stored in the system; (vi) only requires a store of the password-beginnings, which will not disclose any full passwords; and/or (vii) prevents the user from typing a password, after determining with certainty, that the user has begun typing that password, by detecting a match with a known password-beginning.

Some embodiments of the present invention may include one, or more, of the following operations, features, characteristics and/or advantages: (i) by storing a list of password-beginnings, the system can monitor text that is typed in any field (for example, in the body of an email, or into a commercially available word processing software document), and thus prevent the full password from being typed in any location; (ii) uses a method of preventing the completion of a password that the user has begun typing by comparing the string being typed to a known list of password-beginnings; (iii) has the advantage of being simpler; (iv) can work with certainty (as the strings can be directly compared); and/or (v) prevents a user accidentally exposing their password by entering it into the wrong field.

Some embodiments of the present invention may include one, or more, of the following operations, features, characteristics and/or advantages: (i) actively prevents the user from typing a complete password anywhere other than a specific password field that protects it from being seen; (ii) if the user begins typing their password into another field, the user is actively prohibited from entering the complete password in that field; (iii) works by retaining a list of sensitive characters that match the beginning of passwords used by the user; (iv) the system can prevent the user from entering their entire password anywhere other than into the fields that are specifically flagged as appropriate for passwords; and/or (v) prevents a user from typing the users password into any field other than the correct field, thus preventing the users entire password from being exposed.

Some embodiments of the present invention may include one, or more, of the following operations, features, characteristics and/or advantages: (i) could be implemented in commercially available software to improve the security of the products; (ii) provides licensing value for companies; (iii) can increase the security of IT (information technology) systems safer by making it harder for people to make costly mistakes when using secured systems; (iv) can give users increased confidence that they can use a system safely; (v) stores a dictionary of password-beginnings, such that: (a) if the user begins to type a password into a non-password field, they are restricted from typing any more of that password than the stored password-beginning, and/or (b) note that (a) above reduces security in the sense that the first few characters of the password are now known to the local system, but this should not threaten the security of the whole password if it is a good password); and/or (vi) could be implemented in the operating system, browser or VPN (virtual private network).

According to embodiments of the present invention, the paragraphs below will now provide two (2) examples of the present invention.

Example: Module to store password-beginnings include: (i) when setting up a new account, or accessing an existing account from this system for the first time: (a) determines that a string is a password by detecting that it has been typed into the password field (and in most cases verifying that it has been re-entered into the confirm password field), and (b) store the first N characters of this password as a password-beginning in a store of password-beginnings for the user where the choice of N is implementation specific; and (ii) detecting and storing this password-beginning is an embodiment of the present invention.

Example: Module to detect that a password is being typed into a non-password field: (i) the user starts typing a string which triggers the system; (ii) the system checks whether the string is being entered into a password field (for example, input type="password"); and (iii) if typing input is not in a password field: (a) the string being typed by the user is checked against the stored password-beginnings list where: (1) each time a character is added to the string, the previous N characters are matched against all password-beginnings of that length stored in the password store, and (2) allows a password-beginning to be detected even if it is not delimited by a new field or a space bar before the password, and (b) if the string being typed matches a known password-beginning then: (1) the user is prevented from entering the rest of the string unless they actively confirm that they wish to do so (to prevent the secure part of the password from being revealed), and (2) (optional) the password-beginning that has already been entered in that field is hidden or deleted (to minimize the time that the insecure part of the password is revealed).

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

And/or: inclusive or; for example, A, B "and/or" C means that at least one of A or B or C is true and applicable.

Including/include/includes: unless otherwise explicitly noted, means "including but not necessarily limited to."

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer-implemented method (CIM) comprising:
    displaying a password entry screen of a user interface, with the password entry screen including a username entry field for entry of ta user's username and a password entry field for entry of the user's password;
    receiving a first user input through the username entry field including an entered alphanumeric string of N keystrokes where N is an integer greater than two;
    checking the entered alphanumeric string against the password to determine that the entered alphanumeric string matches a first N alphanumeric characters of the password; and
    responsive to the determination that the entered alphanumeric string matches the first N characters of the password, changing a display of the username entry field so that the entered alphanumeric string is not visible in the display of the username entry field.

2. A computer program product (CPP) comprising:
    a set of storage device(s); and
    computer code stored collectively in the set of storage device(s), with the computer code including data and instructions to cause a processor(s) set to perform at least the following operations:
        displaying a password entry screen of a user interface, with the password entry screen including a username entry field for entry of ta user's username and a password entry field for entry of the user's password,
        receiving a first user input through the username entry field including an entered alphanumeric string of N keystrokes where N is an integer greater than two;
        checking the entered alphanumeric string against the password to determine that the entered alphanumeric string matches a first N alphanumeric characters of the password; and
        responsive to the determination that the entered alphanumeric string matches the first N characters of the password, changing a display of the username entry field so that the entered alphanumeric string is not visible in the display of the username entry field.

3. A computer system (CS) comprising:
    a processor(s) set;
    a set of storage device(s); and
    computer code stored collectively in the set of storage device(s), with the computer code including data and instructions to cause the processor(s) set to perform at least the following operations:
        displaying a password entry screen of a user interface, with the password entry screen including a username entry field for entry of ta user's username and a password entry field for entry of the user's password,
        receiving a first user input through the username entry field including an entered alphanumeric string of N keystrokes where N is an integer greater than two,
        checking the entered alphanumeric string against the password to determine that the entered alphanumeric string matches a first N alphanumeric characters of the password, and
        responsive to the determination that the entered alphanumeric string matches the first N characters of the password, changing a display of the username entry field so that the entered alphanumeric string is not visible in the display of the username entry field.

* * * * *